United States Patent
Biswas

(10) Patent No.: US 9,762,702 B2
(45) Date of Patent: Sep. 12, 2017

(54) MULTIPATH TCP SIGNALING WITH APPLICATION SPECIFIC TAGS

(71) Applicant: Apple Inc., Cupertino, CA (US)

(72) Inventor: Anumita Biswas, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 110 days.

(21) Appl. No.: 14/499,139

(22) Filed: Sep. 27, 2014

(65) Prior Publication Data

US 2015/0201046 A1 Jul. 16, 2015

Related U.S. Application Data

(60) Provisional application No. 61/927,337, filed on Jan. 14, 2014.

(51) Int. Cl.
| | |
|---|---|
| *H04L 29/06* | (2006.01) |
| *H04W 76/02* | (2009.01) |
| *H04N 21/236* | (2011.01) |
| *H04L 29/08* | (2006.01) |
| *H04N 21/462* | (2011.01) |

(52) U.S. Cl.
CPC .......... *H04L 69/163* (2013.01); *H04L 67/327* (2013.01); *H04L 69/14* (2013.01); *H04L 69/22* (2013.01); *H04L 69/321* (2013.01); *H04N 21/236* (2013.01); *H04W 76/02* (2013.01); *H04N 21/4621* (2013.01)

(58) Field of Classification Search
CPC .............. H04L 67/2804; H04N 21/236; H04N 21/4621
See application file for complete search history.

(56) References Cited

U.S. PATENT DOCUMENTS

| | | | |
|---|---|---|---|
| 8,396,458 B2 | 3/2013 | Raleigh | |
| 2009/0213859 A1 | 8/2009 | De Silva | |
| 2012/0099601 A1* | 4/2012 | Haddad | H04L 29/12405 370/401 |
| 2012/0215637 A1* | 8/2012 | Hermann | G06Q 30/0207 705/14.53 |
| 2013/0031256 A1* | 1/2013 | Hampel | H04L 69/16 709/227 |

(Continued)

OTHER PUBLICATIONS

Jagannathan, Pathra and Prabhuraj, V.K.; "Classification of traffic using Application Tags", May 9, 2009, pp. 1-6.*

(Continued)

*Primary Examiner* — Salvador E Rivas
(74) *Attorney, Agent, or Firm* — Meyertons Hood Kivlin Kowert & Goetzel, P.C.; Jeffrey C. Hood

(57) ABSTRACT

This disclosure relates to techniques for electronic devices to identify application streams multiplexed onto a multipath transmission control protocol (MPTCP) connection using MPTCP signaling. According to one embodiment, an MPTCP connection may be established between an electronic device and a remote endpoint. Each of two or more application streams (each associated with a respective application) may be communicated between the two endpoints over the same MPTCP connection. MPTCP headers of MPTCP packets of each application stream may include application specific tags identifying the MPTCP packets of each application stream, respectively, as corresponding to their respective application stream.

20 Claims, 6 Drawing Sheets

(56) References Cited

U.S. PATENT DOCUMENTS

2013/0103791 A1    4/2013  Gottdenker
2014/0003434 A1*   1/2014  Assarpour ............. H04L 43/026
                                                          370/392

OTHER PUBLICATIONS

Ford et al., "RFC 6824: TCP Extensions for Multipath Operations with Multiple Addresses" Jan. 2013, pp. 1-64.*
Bonaventure, Olivier, "Decoupling TCP from IP with Multipath TCP", Mar. 2013, pp. 1-163.*
Stewart, "RFC 4960: Stream Control Transport Protocol", Sep. 2007, pp. 1-152.*

* cited by examiner

```
    0 1 2 3 4 5 6 7 8 9 0 1 2 3 4 5 6 7 8 9 0 1 2 3 4 5 6 7 8 9 0 1
   +---------------+---------------+-------+----------------------+
   |     Kind      |    Length     |Subtype| (reserved) |T|F|m|M|a|A |
   +---------------+---------------+-------+----------------------+
   |                Application Specific Tag (4 octets)            |
   +---------------------------------------------------------------+
   |          Data ACK (4 or 8 octets, depending on flags)         |
   +---------------------------------------------------------------+
   |     Data sequence number (4 or 8 octets, depending on flags)  |
   +---------------------------------------------------------------+
   |              Subflow sequence number (4 octets)               |
   +-------------------------------+-------------------------------+
   |   Data-Level Length (2 octets) |      Checksum (2 octets)     |
   +-------------------------------+-------------------------------+
```

*FIG. 8*

MULTIPATH TCP SIGNALING WITH APPLICATION SPECIFIC TAGS

PRIORITY CLAIM

The present application claims benefit of priority to U.S. Provisional Application No. 61/927,337 titled "Multipath TCP Signaling with Application Specific Tags" and filed on Jan. 14, 2014, which is hereby incorporated by reference in its entirety as though fully and completely set forth herein.

FIELD

The present disclosure relates to electronic devices, and more particularly to a system and method for identifying application streams using multipath TCP signaling.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Some of these standards may serve complementary functions while others may typically be considered competitors attempting to fulfill similar needs amongst consumers. Accordingly, it is common for at least some wireless devices to communicate using multiple wireless technologies or standards. For example, some wireless devices (such as some smart phones, etc.), may be capable of cellular communication as well as Wi-Fi communication.

SUMMARY

Embodiments are presented herein of, inter alia, techniques for identifying an application stream communicated over an MPTCP connection using MPTCP signaling, and of devices configured to implement the methods.

By providing application specific tags or other techniques for specifying an application associated with data communicated over an MPTCP connection at the MPTCP layer, a destination endpoint acting as a bridge which redirects individual application streams to appropriate service centers may be able to perform such redirection without unpacking the MPTCP payload.

The techniques described herein may be implemented in and/or used with a number of different types of devices, including but not limited to portable media players, cellular phones, tablet computers, wearable devices, set top box devices, television systems, load balancers, servers, and other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIG. 8 illustrates an exemplary data sequence signal option format including an application specific tag field, according to one embodiment;

Figure 1:
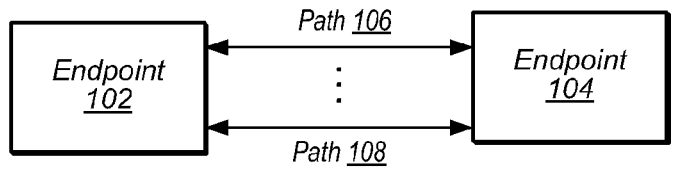
FIGS. 1-2 illustrate exemplary (and simplified) wireless communication systems, according to one embodiment.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

INCORPORATION BY REFERENCE

Internet Engineering Task Force (IETF) Request For Comments (RFC) 6824, titled "TCP Extensions for Multipath Operation with Multiple Addresses", dated January 2014, is hereby incorporated by reference in its entirety as though fully and completely set forth herein.

DETAILED DESCRIPTION OF THE EMBODIMENTS

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
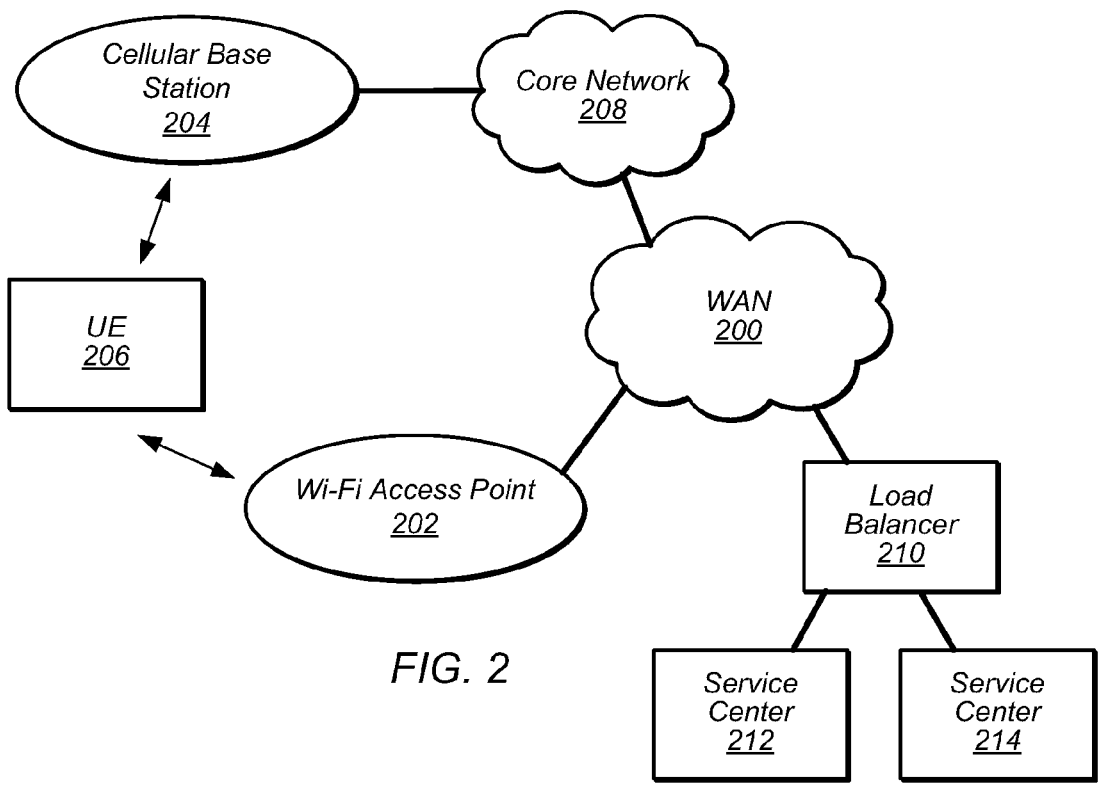

FIGS. 1-2—Communication System

FIGS. 1-2 illustrate exemplary (and simplified) communication systems, according to certain embodiments. It is noted that the systems of FIGS. 1-2 are merely examples of possible systems, and embodiments may be implemented in any of various systems, as desired.

The exemplary wireless communication system illustrated in FIG. 1 includes two endpoints having multiple communication paths between them. Thus, endpoint 102 may be capable of communicating with endpoint 104 via path 106 or path 108.

Each of endpoint 102 and endpoint 104 may be a 'fixed' or 'mobile' endpoint. A fixed endpoint may be an endpoint which is substantially stationary and/or which communicates by way of one or more wired communication techniques. Some examples might include a server computer providing cloud-based services via the Internet, a bridge, a load balancer, a personal desktop computer or workstation, a set top box, a television, etc. A mobile endpoint may be an endpoint which is substantially mobile and/or which communicates by way of one or more wireless communication techniques. Some examples might include a mobile telephone or smart phone, tablet computer, portable gaming device, portable media player, etc. Note that hybrid endpoints which share traits of both fixed and mobile endpoints are also possible. For example, many laptop computers may be capable of performing both wireless (e.g., Wi-Fi) and wired (e.g., Ethernet) communication, and additionally may be capable of substantial movement (e.g., when operating from batter reserve power) or may be substantially stationary (e.g., when docked and/or connected to a wall outlet for power) at various times.

One or both of endpoints 102, 104 may be multihomed. For example, one or both of endpoint 102, 104 may be capable of communicating via multiple network interfaces. As such, there may be multiple possible communication paths 106, 108 between endpoints 102, 104. Note that although two paths (i.e., path 106 and path 108) are illustrated in FIG. 1, it should be noted that any number of paths may exist between endpoints. For example, if each of endpoints 102, 104 are capable of communicating via two different network interfaces, there might be four possible communication paths between them. Other numbers of different network interfaces and possible communication paths are also possible.

The multiple communication paths 106, 108 may be used to establish a multipath transmission control protocol (MPTCP) link or connection between endpoints 102 and 104. The MPTCP connection may be established according to and/or include any of various features described in the MPTCP specification IETF RFC 6824 (incorporated by reference above). For example, one or more subflows of the MPTCP connection may be established over path 106, while one or more subflows of the MPTCP connection may be established over path 108. Any number of additional subflows may optionally be created over one or more other paths, if desired. Such an MPTCP connection may be established and configured/controlled according to various aspects of the present disclosure.

The exemplary wireless communication system illustrated in FIG. 2 represents one possible communication system having the characteristics of the exemplary wireless communication system illustrated in FIG. 1. In particular, a first endpoint (i.e., a wireless user equipment ("UE") device 206) may be capable of communicating with another endpoint (i.e., load balancer 210) using either of a first communication path (i.e., via cellular base station 204, core network 208, and wide area network 200) or a second communication path (i.e., via Wi-Fi access point 202 and wide area network 200).

As shown, the UE device 206 communicates with a Wi-Fi access point 202 and with a cellular base station 204. The access point 202 may be an access point providing a wireless local area network (WLAN). The access point 202 may be equipped to communicate with a wide area network (WAN) 200, such as the Internet. Thus, the access point 202 may facilitate communication between the UE 206 and the network 200. The access point 202 and the UE 206 may be configured to communicate over the transmission medium using Wi-Fi, including any of various versions of IEEE 802.11 (e.g., a, b, g, n, ac, etc.). Note that the access point 202 may also facilitate communication between the UE and other computing devices which also participate in the WLAN directly.

The base station 204 may be a base transceiver station (BTS) or cell site (a "cellular base station"), and may include hardware that enables wireless communication with cellular devices (such as UE 206) according to one or more cellular communication protocols. The UE 206 and the cellular base station 204 may communicate using any of various cellular communication technologies such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), etc.

As shown, the cellular base station may be equipped to communicate with a core network 208 of a cellular service provider. Thus, the base station 204 may facilitate communication between the UE 206 and the core network 208. The core network 208 may in turn be equipped to communicate with WAN 200 (e.g., the Internet, or another wide area network). Note that the core network 208 may also or alternatively be equipped to communicate with one or more other networks (e.g., a telecommunication network such as a public switched telephone network (PSTN), one or more core networks of other cellular service providers, etc.). The cellular base station 204 may thus provide the UE 206 (and potentially numerous other UEs) with various telecommunication capabilities, such as voice and SMS services and/or data services.

Thus, UE 206 may be capable of communicating using multiple wireless communication standards, including at least one wireless networking protocol (e.g., Wi-Fi) and at least one cellular communication protocol (e.g., GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), etc.). Note additionally that the UE 206 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. In addition, or as an alternative, the UE 206 may be capable of communicating using one or more wired communication standards. For example, the UE 206 may be capable of communicating with one or more wired access points, e.g., via Ethernet. It may, for example, be possible for the UE 206 to couple via wired means to the Wi-Fi access point 202 in addition to or as an alternative to utilizing Wi-Fi communication. Other combinations of wireless and wired communication standards (including more than two wireless and/or wired communication standards) are also possible.

The load balancer 210 may also be equipped to communicate with WAN 200. The load balancer 210 may provide access to a cluster or server farm configured to provide one or more cloud-based services via the Internet. For example, as shown, the load balancer may further be equipped to communicate with service centers 212, 214, which may each include one or more computing devices (e.g., servers) configured to provide cloud-based services. Each service center might, for example, be configured to provide service with respect to a particular application, such as a mapping application, an intelligent personal assistant application, an e-commerce application, a media streaming application, a gaming application, etc. It should be noted that while load balancer 210 is shown in FIG. 2 as one possible exemplary access port (and potential MPTCP endpoint) to service centers 212, 214, any of various devices may be used (alternatively or in combination with load balancer 210) as intermediary/access port devices/entities to the service centers 212, 214 if desired, such as gateways, routers, firewalls, and/or any of various other "middleboxes". In addition, it should be noted that while not explicitly shown, the load balancer 210 may include any number of network interfaces for connecting to the WAN 200, including one or more wired network interfaces and/or one or more wireless network interfaces.

Figure 3:
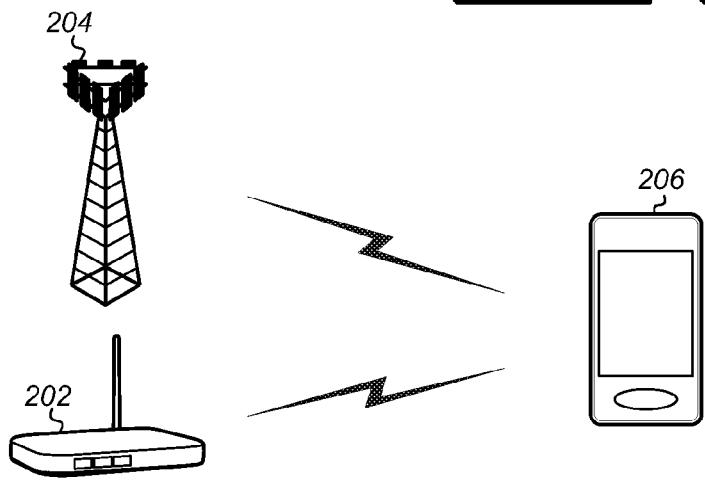
FIG. 3 illustrates a cellular base station and a Wi-Fi access point in communication with a wireless user equipment device, according to one embodiment.

FIG. 3 illustrates the UE device 206 in communication with the cellular base station 204 and the Wi-Fi access point 202. The UE 206 may be a device with multiple wireless network connectivity such as a mobile phone, a hand-held device, a wearable device, a computer or a tablet, or virtually any type of wireless device.

The UE 206 may include a processor that is configured to execute program instructions stored in memory. The UE 206 may perform any of the method embodiments described herein by executing such stored instructions. Alternatively, or in addition, the UE 206 may include a programmable hardware element such as an FPGA (field-programmable gate array) that is configured to perform any of the method embodiments described herein, or any portion of any of the method embodiments described herein.

The UE 206 may be configured to communicate using any of multiple wireless communication protocols. For example, the UE 206 may be configured to communicate using at least one cellular communication protocol (such as CDMA2000, LTE, LTE-A, etc.) and Wi-Fi. Other combinations of wireless and/or wired communication standards are also possible.

The UE 206 may include one or more antennas for communicating using one or more wireless communication protocols or technologies. In one embodiment, the UE 206 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 206 may share one or more parts of a receive and/or transmit chain between multiple wireless communication technologies, such as those discussed above.

In some embodiments, the UE 206 may include separate (and possibly multiple) transmit and/or receive chains (e.g., including separate RF and/or digital radio components) for each wireless communication protocol with which it is configured to communicate. As a further possibility, the UE 206 may include one or more radios which are shared between multiple wireless communication protocols, and one or more radios which are used exclusively by a single wireless communication protocol. For example, the UE 206 might include a shared radio for communicating using either of LTE or 1xRTT (or LTE or GSM), and separate radios for communicating using each of Wi-Fi and Bluetooth. Other configurations are also possible.

Figure 4:
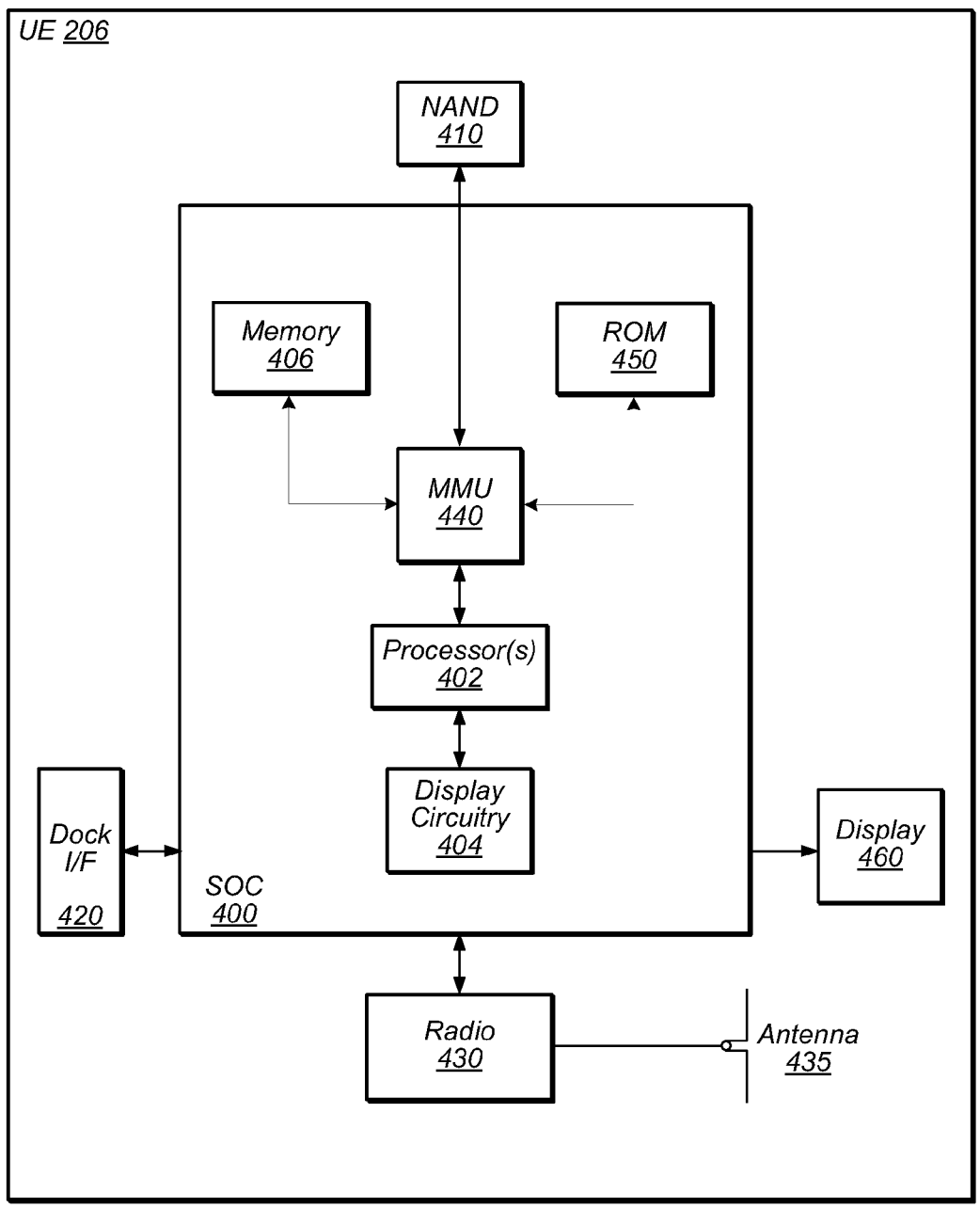
FIG. 4 illustrates an exemplary block diagram of a wireless user equipment device, according to one embodiment.

FIG. 4—Exemplary Block Diagram of a UE

FIG. 4 illustrates an exemplary block diagram of a UE 206, according to one embodiment. As shown, the UE 206 may include a system on chip (SOC) 400, which may include portions for various purposes. For example, as shown, the SOC 400 may include processor(s) 402 which may execute program instructions for the UE 206 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As shown, the SOC 400 may be coupled to various other circuits of the UE 206. For example, the UE 206 may include various types of memory (e.g., including NAND flash 410), a connector interface 420 (e.g., for coupling to a computer system, dock, charging station, etc.), the display 460, and wireless communication circuitry (or "radio") 430 (e.g., for LTE, LTE-A, CDMA2000, Bluetooth, Wi-Fi, GPS, etc.).

The UE device 206 may include at least one antenna (and possibly multiple antennas, e.g., for MIMO and/or for implementing different wireless communication technologies, among various possibilities), for performing wireless communication with base stations, access points, and/or other devices. For example, the UE device 206 may use antenna(s) 435 to perform the wireless communication.

The UE 206 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 6:
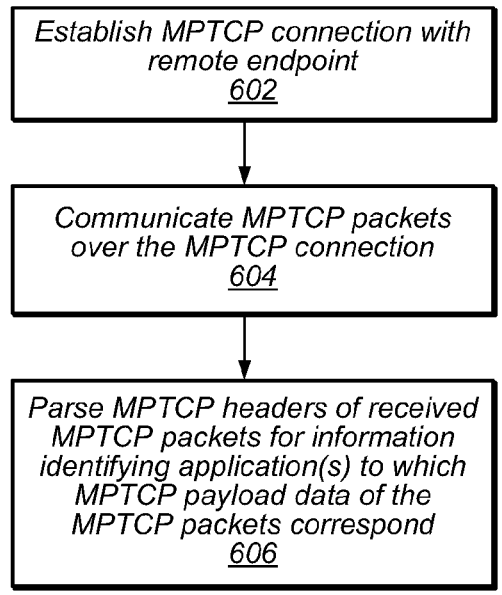
FIG. 6 is a flowchart diagram illustrating aspects of a technique for specifying an application associated with an MPTCP connection using MPTCP signaling, according to one embodiment.
Figure 7:
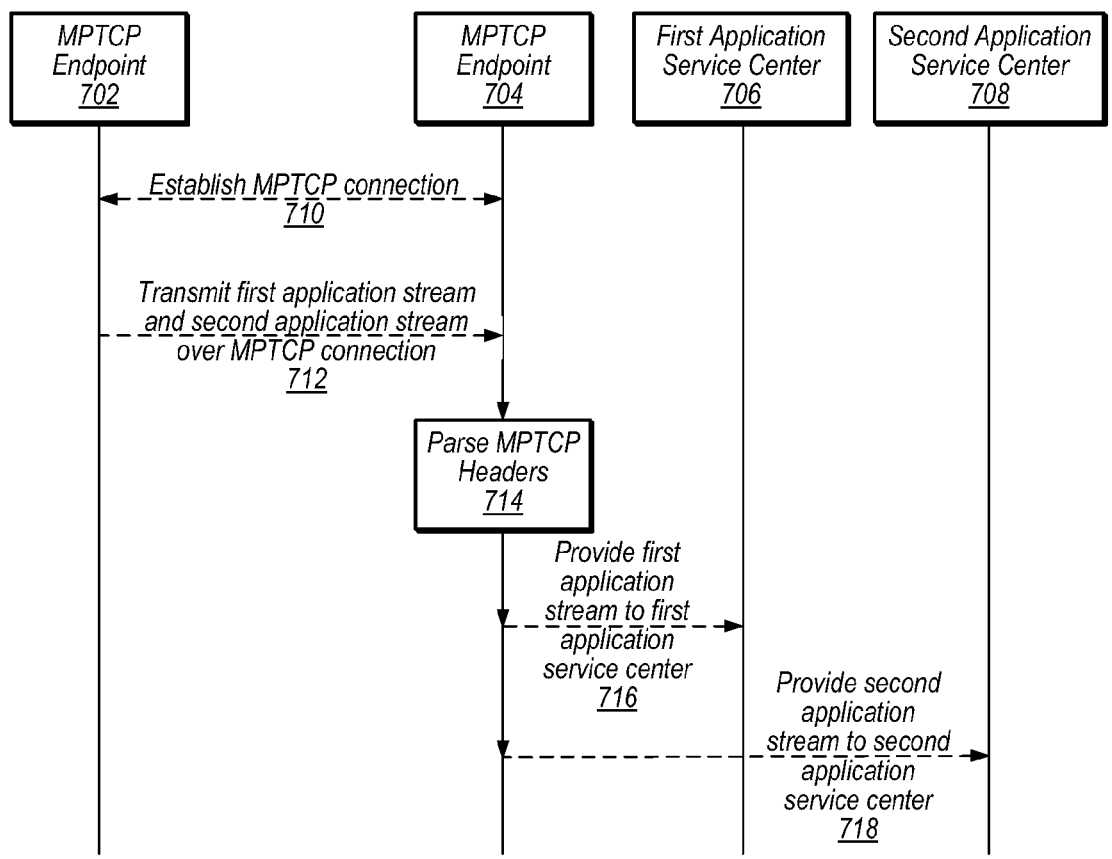
FIG. 7 is a message sequence chart illustrating an exemplary message sequence which might occur when using MPTCP signaling to specify applications associated with an MPTCP connection, according to one embodiment.

As described herein, the UE 206 may include hardware and software components for implementing features for identifying application streams using MPTCP signaling, such as those described herein with reference to, inter alia, FIGS. 6-7. The processor 402 of the UE device 206 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 206, in conjunction with one or more of the other components 400, 404, 406, 410, 420, 430, 435, 440, 450, 460 may be configured to implement part or all of the features described herein, such as the features described herein with reference to, inter alia, FIGS. 6-7.

Figure 5:
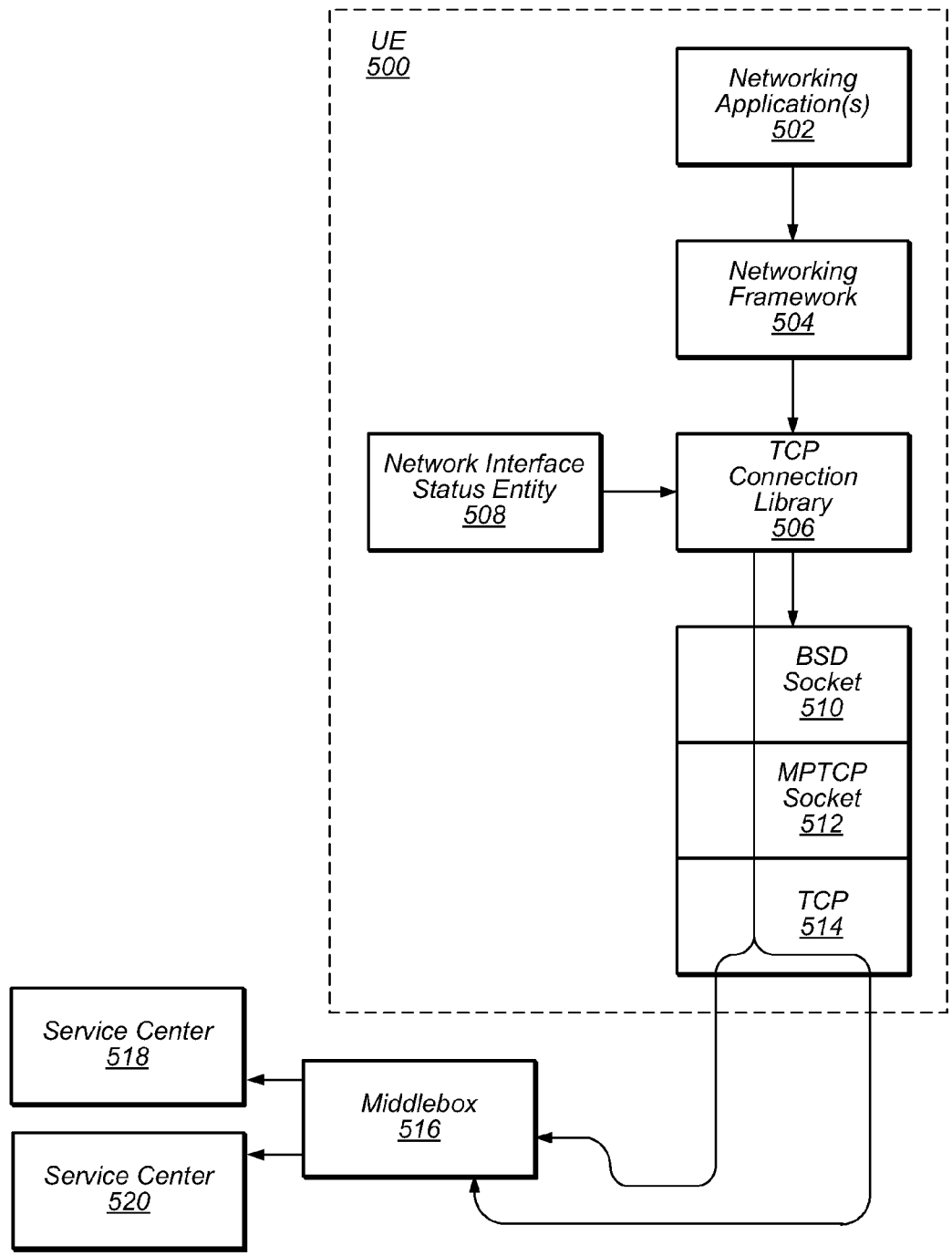
FIG. 5 illustrates an exemplary protocol stack which may be used in conjunction with multipath transmission control protocol communications, according to one embodiment.

FIG. 5—MPTCP Capable Protocol Stack

FIG. 5 illustrates an exemplary protocol stack which may be used by a UE 500 to establish, configure, and control MPTCP connections and subflows between the UE 500 and a middlebox 516 (which may provide redirection thence to service centers 518, 520), according to various aspects of the present disclosure. It should be recognized that while the exemplary protocol stack illustrated in FIG. 5 represents one possible protocol stack which may be used to implement aspects of the present disclosure, MPTCP connections and subflows may be established, configured, and/or controlled in conjunction with any of numerous alternate protocol stacks, in conjunction with different devices than UE 500 and middlebox 516 and/or service centers 518, 520 (e.g., without an intermediary middlebox 516 or with multiple middleboxes). As such, the exemplary protocol stack illustrated in FIG. 5 should not be considered limiting to the disclosure as a whole.

As shown, one or more networking applications 502 may be executing on the UE 500. The networking application(s) may include any application(s) which utilize a network connection to communicate over a network. For example, the application(s) (or "app(s)") 502 may include a browser application, email application, chat application, social media application, media streaming application, game application, intelligent personal assistant application, mapping application, and/or any of a variety of other types of networking applications.

The networking application(s) 502 may interface with a networking framework 504, which may be provided by an operating system executing on the UE 500. The networking framework 504 may provide a level of abstraction between the application 502 and the lower level networking functionality provided by the UE 500. The networking framework 504 may in turn interface with a TCP connection library entity 506. The TCP connection library 506 may have knowledge of the status of various network interfaces, by way of communication with a network interface status entity 508.

The network interface status entity 508 may monitor the up/down status and support network interface upkeep of various network interfaces available to the UE 500. Information regarding the status of the various network interfaces available to the UE 500 may be particularly helpful for a mobile device which is capable of utilizing one or more forms of wireless communication, such as cellular communication and Wi-Fi. For example, the network interface status entity 508 may be aware of whether or not a cellular data link is available at any given time, and may similarly be aware of whether or not a Wi-Fi link is available at any given time. The network interface status entity 508 may similarly monitor any additional or alternative network interfaces as well. In some cases the network interface status entity 508 may also be aware of any further considerations relating to various available network interfaces, such as network interface use preferences. For example, for many mobile devices, Wi-Fi data communication may be less expensive than cellular data communication (e.g., if a cellular service provider offers metered data usage while a Wi-Fi service provider offers unmetered data usage); in such a case, a preference to use a Wi-Fi network interface rather than a cellular network interface for data communication when possible may be noted by the network interface status entity 508 in the UE 500. Other preferences or considerations may also or alternatively be stored.

Being aware of such information by way of its communication with the network interface status entity 508, then, the TCP connection library 506 may act as a transport connection manager and intelligently manage TCP connections for the networking application 502. For example, the TCP connection library 506 may be capable of initiating and tearing down TCP connections (including MPTCP subflows) with networked entities (such as middlebox 516) via various network interfaces, establishing and/or modifying MPTCP subflow priorities, and asserting control over MPTCP subflow creation and priority status modification, among various possibilities. The TCP connection library 506 may do so by way of socket layers BSD socket 510, MPTCP socket 512, and TCP connection/subflows 514.

As shown, the resulting MPTCP subflow(s) may be established as part of an MPTCP connection with the middlebox 516. The middlebox 516 may include any of a variety of types of middlebox functionality, such as a firewall, load balancing, network address translation, etc. The middlebox 516 may in turn route data to service center 518 or service center 520, and possibly more specifically to a server acting as part of service center 518 or 520 in a separate connection (e.g., according to a load balancing algorithm).

Each service center 518, 520 may be configured (e.g., may be specifically built and/or arranged) for a particular application. Thus, the middlebox 516 may redirect an application stream received over an MPTCP connection with the UE 500 accordingly to the nature of the networking application 502. For example, if an application stream for a mapping application is communicated to middlebox 516 from the UE 500, and service center 518 is a service center for that mapping application, the application stream may be redirected by middlebox 516 to service center 518. If an application stream for an intelligent personal assistant application is communicated to middlebox 516 from the UE 500, and service center 520 is a service center for that intelligent personal assistant application, the application stream may be redirected by middlebox 516 to service center 520. If MPTCP signaling is used to identify application streams being communicated over an MPTCP connection, such as further described subsequently herein, the middlebox 516 may be able to redirect such application streams by parsing the MPTCP headers, potentially without unpacking the MPTCP payload of MPTCP packets of those application streams. Such application specific tagging using MPTCP signaling may particularly facilitate efficient redirection/demultiplexing of application streams to their appropriate service centers if multiple application streams are multiplexed onto a single MPTCP connection (for example, if the above-described exemplary mapping application and intelligent personal assistant applications of the UE 500 were concurrently active and using their network connections).

FIGS. 6-7—Application Stream Identification Using MPTCP Signaling Flow

FIG. 6 is a flowchart diagram illustrating an exemplary process for a device to use MPTCP signaling to identify application streams being communicated over an MPTCP connection, according to one embodiment. FIG. 7 is a signal flow diagram illustrating exemplary signal flow between various devices which implement aspects of the method of FIG. 6, according to one embodiment. The method shown in FIG. 6 and the signal flow shown in FIG. 7 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In step 602 an MPTCP connection may be established between the device implementing the process of FIG. 6 and a remote endpoint. The MPTCP connection may be initiated as part of operation of a networking application (e.g., such as networking application 502 illustrated in FIG. 5). The MPTCP connection may include at least one and possibly multiple communication paths (MPTCP subflows) between a first device (e.g., the device implementing the process) and a second device (e.g., the remote endpoint) as part of the MPTCP connection. At least in some instances, the MPTCP connection may be used as a transport mechanism for applications that is network agnostic—that is, applications may not need to be aware of the underlying network connectivity of the transport mechanism when MPTCP is used. This may be useful since in many instances establishing multiple communication paths may be desirable in order to provide increased resiliency, e.g., in case one of the communication paths fails. For example, a mobile device might utilize both Wi-Fi and cellular connectivity in order to provide greater robustness in case of spotty coverage, dead zones, etc. The MPTCP connection may be managed by a TCP connection management entity executing on the device, such as the TCP connection library 506 illustrated in FIG. 5.

In 604, MPTCP packets may be communicated over the MPTCP connection. Each MPTCP packet may include one or more MPTCP headers as well as MPTCP payload data. For example, an MPTCP Data Sequence Signal (DSS) option may be provided as an MPTCP header. The MPTCP payload data for each packet may include application data corresponding to an application. The MPTCP payload data may also include headers or other overhead information for one or more higher layers, in some instances.

Note that the MPTCP packets communicated may include outgoing and/or incoming packets. In other words, the device implementing the method may generate and transmit MPTCP packets to the remote endpoint over the MPTCP connection, and/or may receive, parse, and/or redirect MPTCP packets received from the remote endpoint over the MPTCP connection.

The MPTCP header(s) of each packet may include information identifying an application to which that MPTCP packet (e.g., MPTCP payload data of that MPTCP packet) corresponds. As one possibility, the information may take the form of an application specific tag value provided in a dedicated application specific tag field of an MPTCP header of each MPTCP packet. Such application specific tag values may be standardized such that each individual application which may be tagged is provided with a unique application specific tag value which permanently represents that individual application, or may be dynamically defined and agreed upon on a per-session basis between MPTCP endpoints, among various possibilities. Numerous other ways of providing information identifying an application to which an MPTCP packet corresponds using the MPTCP headers of that packet are also possible.

In some instances, it may be optional whether to configure MPTCP packets to include information identifying an application to which that MPTCP packet corresponds. For example, in some implementations, devices may be configured to specify an application associated with each MPTCP packet communicated over an MPTCP connection if the MPTCP connection is being used to communicate multiple application stream, but not to specify an application associated with each MPTCP packet communicated over an MPTCP connection if the MPTCP connection is only being used to communicate one application stream.

In such a case, the MPTCP header of each MPTCP packet may further include information indicating whether or not the MPTCP packet includes information identifying an application to which MPTCP payload data of that MPTCP packet corresponds. For example, an "application specific tag flag" bit may be defined within the MPTCP header, such that a '1' value indicates that an application specific tag field is included in the header, while a '0' value indicates that no application specific tag field is included in the header, or vice versa. Other means of providing such information are also possible.

Note also that while the above example in which devices are configured to not specify an application associated with each MPTCP packet communicated over an MPTCP connection if the MPTCP connection is only being used to communicate one application stream represents one possible implementation possibility, configurations are also possible in which application specific tags or other identifying information is provided for MPTCP packets even if an MPTCP connection over which those MPTCP packets are communicated is only being used to communicate one application stream at that time. This may still be useful, for example, for a load balancer at which numerous MPTCP connections (e.g., from different devices) are terminated and which provides redirection of application streams communicated over those MPTCP connections to multiple possible application service centers.

In 606, at least a portion of the MPTCP headers of received MPTCP packets may be parsed. The MPTCP headers may particularly be parsed for information indicating whether each MPTCP packet includes information identifying an application to which MPTCP payload data of that MPTCP packet corresponds, and (assuming such information is present) for information identifying to which application each received MPTCP packet corresponds.

Based on parsing the MPTCP headers of received MPTCP packets, those MPTCP packets (e.g., at least the MPTCP payload of those MPTCP packets) may be directed to an appropriate application. For example, if the appropriate application is executing on the device implementing the method (e.g., if the device is a user device), those MPTCP packets may be directed to the instance of the application executing on the device. As another example, if the device implementing the method is a load balancer and the appropriate application is provided by an application service center coupled to (e.g., external to) the load balancer, those MPTCP packets may be directed to the application service center.

By determining the appropriate application by parsing the MPTCP headers (e.g., as opposed to parsing the MPTCP payload to determine the appropriate application), it may be possible to rapidly direct application streams to their ultimate destinations. This may be particularly useful for an endpoint which provides re-direction of numerous user connections to appropriate application service centers, such as the load balancer example previously provided. For such a device, reading just the MPTCP headers of incoming packets, and possibly even just a portion of those MPTCP headers (for example if the application specific tags are located towards the beginning of the header(s) of each MPTCP packet), may be significantly cheaper than reading the MPTCP payload data of incoming packets to find application specific bridge.

Note that at least in some instances (and as previously mentioned), it may be possible to multiplex traffic from multiple application streams to a single destination endpoint onto a single MPTCP connection. Such multiplexing of traffic from multiple application streams onto one MPTCP connection may be accomplished in any of a variety of ways, such as using TCP Minion, SPDY, and/or any of various other schemes.

Such a scheme might be implemented, for example, in case of such a scenario as illustrated and described with respect to FIGS. 2 and 5, in which it may be possible that multiple networking applications are executing on a wireless device concurrently, and further that at least two of those networking applications network communications terminate at the same destination endpoint (e.g., a load balancer acting as an access port to service centers for those networking applications).

In such a scenario, MPTCP packets communicated over an MPTCP connection may include packets whose payload data corresponds to each of the multiple application streams. For example, both "first" MPTCP packets, which correspond a first application stream, and "second" MPTCP packets, which correspond to a second application stream, might be communicated with the remote endpoint over the MPTCP connection. In this case, the MPTCP header information identifying with which application each packet is associated would be different for the first packets than for the second packets (e.g., the application specific tag of the first packets would have a different value than the application specific tag of the second packets). Note that this method of tagging MPTCP packets need not be limited to two applications, but may be used with any number of applications (e.g., by providing an application specific tag for each application) carried on a single MPCTP connection.

As previously noted, FIG. 7 is a signal flow diagram illustrating exemplary signal flow between various devices which implement aspects of the method of FIG. 6. More particularly, FIG. 7 illustrates signal flow in an exemplary system in which multiple application streams are multiplexed onto a single MPTCP connection between an MPTCP endpoint 702 and another MPTCP endpoint 704, in which MPTCP signaling is used to identify the MPTCP packets corresponding to each application multiplexed onto the MPTCP connection, and in which such MPTCP signaling information is used by the MPTCP endpoint 704 to redirect each application stream to an appropriate application service center 706 or 708.

As in step 602 of FIG. 6, in 710 an MPTCP connection may be established between the MPTCP endpoints 702, 704. The MPTCP connection may be established substantially as previously described with respect to step 602 of FIG. 6.

In 712, the MPTCP endpoint 702 may transmit a "first" application stream and a "second" application stream to the MPTCP endpoint 704 over the MPTCP connection. The first application stream may include application data for a different application than the second application stream. The application streams may be packetized into MPTCP packets including MPTCP headers and MPTCP payload data. MPTCP headers of the MPTCP packets of the first application stream and the second application stream may include application specific tags identifying the MPTCP packets of the first application stream and the second application stream, respectively, as corresponding to the first application stream and the second application stream, respectively.

For example, the MPTCP endpoint 702 might generate a ("first") MPTCP packet which corresponds to the first application stream, including generating an MPTCP header for the first MPTCP packet which includes an application specific tag identifying the first MPTCP packet as corresponding to the first application stream, and transmit the first packet to the MPTCP endpoint 704 over the MPTCP connection. Similarly, the MPTCP endpoint 702 might generate a different ("second") MPTCP packet which corresponds to the second application stream, including generating an MPTCP header for the second MPTCP packet which includes an application specific tag identifying the second MPTCP packet as corresponding to the second application stream, and transmit the second packet to the MPTCP endpoint 704 over the MPTCP connection.

In 714, the MPTCP endpoint 704 may parse the MPTCP headers of MPTCP packets received over the MPTCP connection. This may include reading application specific tags of the MPTCP headers to identify to which application each MPTCP packet corresponds. Based on parsing the MPTCP headers, in 716 the MPTCP endpoint 704 may provide the first application stream to the first application service center, and in 718 the MPTCP endpoint 704 may provide the second application stream to the second application service center.

For example, the MPTCP endpoint 704 might receive a MPTCP packet which corresponds to the first application stream (e.g., the "first" MPTCP packet), and may identify the first MPTCP packet as corresponding to the first application stream based on an application specific tag in an MPTCP header of the first MPTCP packet, which may identify the first MPTCP packet as corresponding to the first application stream. Similarly, the MPTCP endpoint 704 might receive a different MPTCP packet which corresponds to the second application stream (e.g., the "second" MPTCP packet), and may identify the second MPTCP packet as corresponding to the second application stream based on an application specific tag in an MPTCP header of the second MPTCP packet, which may identify the second MPTCP packet as corresponding to the second application stream. The first MPTCP packet and the second MPTCP packet (or at least the MPTCP payload of each packet) may then be provided to the appropriate destination based on such identification.

Note that while FIG. 7 illustrates the communication of application data from MPTCP endpoint 702 to MPTCP endpoint 704 and thence to the first application center 706 and the second application center 708, communication of application data in the opposite direction is also possible, and may be performed in a similar manner in reverse. For example, application streams from the first application service center 706 and/or the second application service center 708 might also or alternatively be multiplexed onto and communicated over the MPTCP connection from MPTCP 704 to MPTCP endpoint 702. In such a scenario, MPTCP endpoint 702 might likewise parse MPTCP headers of the incoming MPTCP packets and provide those packets to appropriate destinations, whether internal (e.g., networking applications executing on the MPTCP endpoint 702) or external (e.g., application service centers coupled to the MPTCP endpoint 702) to the MPTCP endpoint 702.

FIG. 8—Exemplary MPTCP Header Format

FIG. 8 illustrates an exemplary data sequence signal (DSS) option format which may be used as an MPTCP header in conjunction with the methods of FIGS. 6 and 7 according to certain implementations. It should be noted that that any number of alternate formats to those illustrated are also possible, and that while the illustrated exemplary format is provided as one possible example, it should not be considered limiting to the disclosure as a whole.

More particularly, FIG. 8 illustrates an exemplary DSS format which provides the possibility to enable or disable the use of application specific tags. As shown, such a DSS option may include kind, length, and subtype fields, after which a set of flag bits may be provided. The flags may include, among other existing/defined flag bits and bits reserved for future flag use, a 'T' flag which may indicate whether or not an application specific tag is added to the packet. For example, if the 'T' flag or bit is set to 1, this may indicate that an application specific tag field is included in the DSS option, while if the 'T' flag or bit is set to 0, this may indicate that an application specific tag field is not included in the DSS option. The use of the values 1 and 0 may alternatively be reversed in meaning if desired.

If an application specific tag is included, the field in which it is located may follow immediately after the flags field, as shown, at least in some instances. This may be the case, for example, in order to avoid the need to parse further into the DSS option (in particular if some or all of the other fields are variable in length and it would be necessary to parse all of the header just to obtain the offset of the application specific tag) and thereby introduce extra computational overhead. Alternatively, the application specific field tag may be located anywhere in the DSS option, as desired. As shown, other fields in the DSS option may include a data acknowledgement field, a data sequence number field, a subflow sequence number field, a data-level length field, a checksum field, and/or any of various other fields, as desired.

Figure 9:
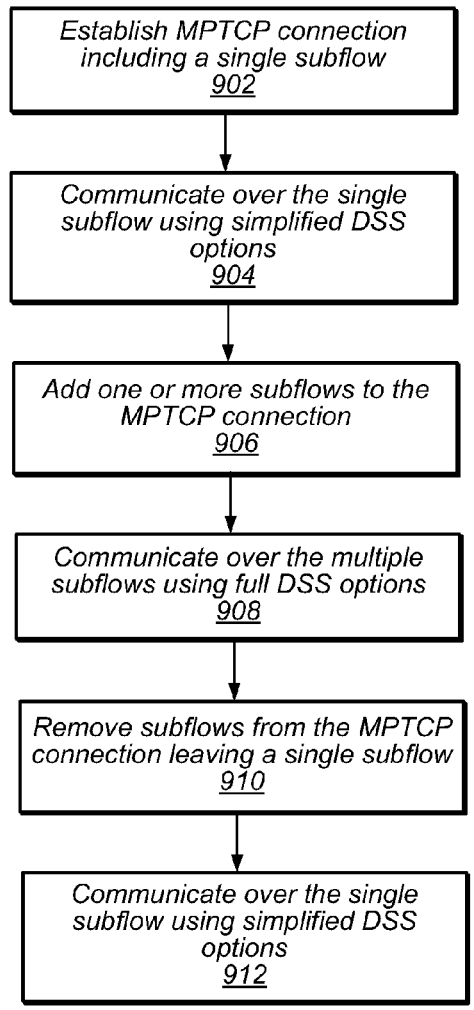
FIG. 9 is a flowchart diagram illustrating aspects of a technique for using simplified data sequence signal options for MPTCP sessions which utilize only one MPTCP subflow, according to one embodiment.
Figure 10:
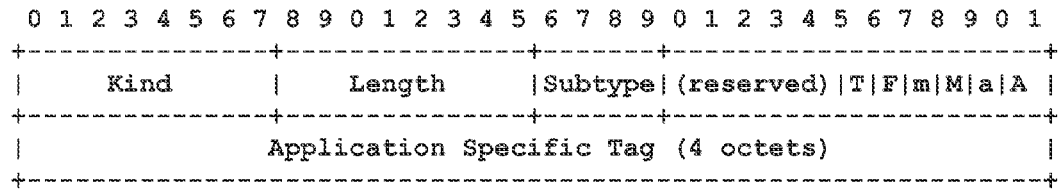
FIG. 10 illustrates an exemplary simplified data sequence signal option format which may be used for MPTCP sessions which utilize only one MPTCP subflow, according to one embodiment.

FIGS. 9-10—Exemplary Simplified MPTCP Header Format and Flowchart

According to MPTCP, it may be the case that the DSS option is always used to accompany data. However, it may sometimes be the case that only one subflow exists during an MPTCP session. In such a case, many of the fields of the DSS which are used primarily to track and order multiple subflows of an MPTCP session may represent excessive overhead. In order to avoid such overhead, it may accordingly be possible to provide the capability to use a truncated or simplified DSS option format in the case of an MPTCP session having a single MPTCP flow.

FIG. 9 is a flowchart diagram illustrating an exemplary method for utilizing a truncated or simplified DSS option when only one subflow exists during an MPTCP session. The method shown in FIG. 9 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In 902, an MPTCP connection including a single subflow may be established between two MPTCP endpoints. It may be the case that only one subflow is ever intended to be created (in which case there may be no need for MPTCP level data sequencing), or more generally, it may simply be the case that there is only one subflow at the current time (in which case there may at least temporarily be no need for MPTCP level data sequencing).

In such a scenario, an MPTCP 'infinite mapping' option (e.g., in this case, the DSS option with the data level length set to 0) may be sent at the start of a connection data transfer between the two MPTCP endpoints in order to set up the use of simplified DSS options, as one possibility. Subsequently, in 904, the MPTCP endpoints may communicate over the single subflow using the simplified DSS options. For example, subsequent data packets may include a DSS option which does not provide MPTCP level data sequencing.

In 906, the MPTCP connection may be 'upgraded', i.e., one or more subflows may be added to the MPTCP connection to support two or more subflows. In this case, it may also be possible to transition from the use of truncated DSS options to full DSS options to provide synchronization between MPTCP subflows. For example, successful joining of a new subflow to an existing subflow may trigger (or include) synchronization of the MPTCP level data sequencing. Such synchronization may be effected by communicating an infinite mapping option (e.g., indicating a starting data sequence number (DSN) and a corresponding TCP sequence number) between the MPTCP endpoints, as one possibility.

After such synchronization, in 908, the MPTCP endpoints may communicate over the multiple subflows using full DSS options. The full DSS option may be used (i.e., communicated as part of each MPTCP packet) as long as more than one subflow is associated with the MPTCP session to maintain the synchronization of the subflows.

In 910, subflows may be closed or removed from the MPTCP connection between the two MPTCP endpoints such that only one subflow between the endpoints remains. In this case it may also be possible to transition from the use of full DSS options to truncated DSS options (e.g., that only carry the application specific tag field subsequent to the flags field). For example, an 'infinite mapping' option (e.g., the DSS option with the data level length set again to 0) can also be communicated between the MPTCP endpoints to coordinate the 'downgrade' from the use of full DSS options to truncated DSS options.

In 912, following such a downgrade, the MPTCP endpoints may communicate over the single subflow using simplified DSS options. In other words, subsequent data packets may again include a simplified DSS option (e.g., which does not provide MPTCP level data sequencing).

FIG. 10 illustrates one exemplary possible truncated DSS option format, which may be used in conjunction with the method of FIG. 9, if desired. As shown, kind, length, subtype, flag, and application specific tag fields may be included in the truncated DSS option illustrated in FIG. 10. In this case, the flags for 'F', 'm', 'M', 'a' and 'A' may be set to 0 (i.e., to effect the truncation of other possible fields of the DSS option, such as those illustrated in FIG. 8), while the 'T' flag may be set to 1. Note that while use of the illustrated truncated DSS option format represents one possible way to reduce overhead for an MPTCP session having a single MPTCP flow, use of other formats and techniques are also possible.

Note that in order to maintain backward compatibility with MPTCP implementations that do not support such a feature for upgrading and downgrading MPTCP connections, in some instances an MPTCP endpoint (e.g., endpoint 102) which supports such a feature may negotiate with its MPTCP peer (e.g., endpoint 104) regarding capabilities by way of MPTCP version numbers. For example, a higher MPTCP version number may be indicated during MPTCP connection setup to indicate support for such a feature than if such a feature is not supported. Thus, if the version number of the remote endpoint is lower than a minimum version number in which the simplified DSS option format feature is supported, then the endpoint supporting the feature may not use the feature for that MPTCP connection.

When the MPTCP connection is closed, a DSS option may be sent with the 'F' bit set. In this case, the full MPTCP DSS option may be sent, e.g., to allow for proper closing of the MPTCP connection, and to avoid a race between one endpoint initiating an upgrade/downgrade while the other endpoint initiates connection closure.

Thus, it may be possible to upgrade and downgrade an MPTCP connection between two MPTCP endpoints from one subflow to multiple subflows and vice versa while optimizing the amount of control information sent in the MPTCP header depending one whether one subflow is active and being used to communicate data or multiple subflows are active and being used to communicate data.

Such a capability may be helpful (among various scenarios) for certain mobile devices for which use of a cellular network connection is relatively expensive (e.g., relative to other networking options such as Wi-Fi), such that having the ability to limit use of that connection (e.g., when other options are available).

For example, it may be desirable to dynamically determine whether or not a cellular subflow would be desirable (e.g., in addition to a Wi-Fi subflow) depending on network conditions. For example, when an existing subflow (e.g., Wi-Fi) uses a network which is losing service or is suffering from large packet loss, the ability to add another subflow (e.g., cellular) and switch data transfer to the added subflow (in addition or alternatively to the original subflow) may help provide a "seamless" failover in which applications utilizing the MPTCP connection do not notice the disruption.

Another scenario to consider is the case in which an MPTCP connection is used to transport multiple application streams. Some application streams may be of low priority or provide data transfer which is considered 'bulk' in nature. When MPTCP is used as a transport for such types kinds of applications, it may be preferable not to transmit these applications' data over a cellular link. Accordingly, in such a case just one MPTCP subflow (e.g., over WiFi) may be used, even though multiple subflows might be possible. By truncating/simplifying the DSS option used in such a case (e.g., to only convey an application specific tag for each packet) in the manner described herein, overhead may be reduced, potentially resulting in greater link efficiency and throughput, without limiting the ability to add additional MPTCP subflows (e.g., in case of higher priority data and/or depending on network conditions, among various possibilities).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 206) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. An electronic device, comprising:
one or more network interfaces; and
a processing element operably coupled to the one or more network interfaces;
wherein the processing element and the one or more network interfaces are configured to:
establish a multipath transmission control protocol (MPTCP) connection with a remote endpoint; and
communicate a first application stream associated with a first application and a second application stream associated with a second application with the remote endpoint by multiplexing the first and second application streams over the MPTCP connection,
wherein MPTCP headers of MPTCP packets of the first application stream and the second application stream comprise an MPTCP full data sequence signal (DSS) option that comprises application specific tags identifying the MPTCP packets of the first application stream and the second application stream, respectively, as corresponding to the first application stream and the second application stream, respectively; and
provide the first application stream to a first entity associated with the first application based on the application specific tags identifying the MPTCP packets of the first application stream as corresponding to the first application stream, wherein the first entity is located at the remote endpoint; and
provide the second application stream to a second entity associated with the second application based on the application specific tags identifying the MPTCP packets of the second application stream as corresponding to the second application stream, wherein the second entity is located at the remote endpoint.

2. The electronic device of claim 1, wherein the processing element and the one or more network interfaces are further configured to:
receive a first MPTCP packet from the remote endpoint over the MPTCP connection, wherein the first MPTCP packet corresponds to the first application stream;
identify the first MPTCP packet as corresponding to the first application stream based on an application specific tag in an MPTCP header of the first MPTCP packet identifying the first MPTCP packet as corresponding to the first application stream;
receive a second MPTCP packet from the remote endpoint over the MPTCP connection, wherein the second MPTCP packet corresponds to the second application stream; and
identify the second MPTCP packet as corresponding to the second application stream based on an application specific tag in an MPTCP header of the second MPTCP packet identifying the second MPTCP packet as corresponding to the second application stream.

3. The electronic device of claim 1, wherein the remote endpoint is a user device, wherein the first entity is the first application executing on the user device, and wherein the second entity is the second application executing on the user device.

4. The electronic device of claim 1, wherein the processing element and the one or more network interfaces are further configured to:
generate a first MPTCP packet, wherein the first MPTCP packet corresponds to the first application stream, wherein generating the first MPTCP packet comprises generating a first MPTCP header for the first MPTCP packet, wherein the first MPTCP header comprises an application specific tag identifying the first MPTCP packet as corresponding to the first application stream;
generate a second MPTCP packet, wherein the second MPTCP packet corresponds to the second application stream, wherein generating the second MPTCP packet comprises generating a second MPTCP header for the second MPTCP packet, wherein the second MPTCP header comprises an application specific tag identifying the second MPTCP packet as corresponding to the second application stream; and
communicate the first MPTCP packet and the second MPTCP packet to the remote endpoint over the MPTCP connection.

5. The electronic device of claim 1,
wherein the MPTCP connection comprises at least a first MPTCP subflow and a second MPTCP subflow.

6. The electronic device of claim 5,
wherein in response to the second MPTCP subflow being removed from the MPTCP connection, the electronic device is further configured to downgrade the full DSS option to a simplified DSS option that does not provide MPTCP level data sequencing.

7. The electronic device of claim 5,
wherein the electronic device comprises a wireless user equipment (UE) device, wherein the one or more network interfaces comprise at least a Wi-Fi network interface and a cellular network interface,
wherein the first MPTCP subflow is established using the Wi-Fi network interface and the second MPTCP subflow is established using the cellular network interface.

8. A method for performing multipath TCP (MPTCP) communication with a remote endpoint, the method comprising:

at an MPTCP layer of an electronic device:

generating a first plurality of MPTCP packets, each MPTCP packet comprising an MPTCP header and MPTCP payload data, wherein MPTCP payload data of first MPTCP packets of the first plurality of MPTCP packets comprises application data corresponding to a first application, wherein MPTCP payload data of second MPTCP packets of the first plurality of MPTCP packets comprises application data corresponding to a second application, wherein each MPTCP header comprises an application specific tag, wherein the application specific tag of MPTCP headers of the first MPTCP packets comprises a first value associated with the first application, wherein the application specific tag of MPTCP headers of the second MPTCP packets comprises a second value associated with the second application, wherein the application specific tags are enabled through a full data sequence signal (DSS) option;

transmitting the first plurality of MPTCP packets to the remote endpoint via an MPTCP connection with the remote endpoint, wherein said transmitting the first plurality of MPTCP packets comprises multiplexing the first MPTCP packets and the second MPTCP packets of the first plurality of MPTCP packets;

receiving a second plurality of MPTCP packets from the remote endpoint via the MPTCP connection with the remote endpoint;

parsing MPTCP headers of the second plurality of MPTCP packets, wherein said parsing comprises reading application specific tags of the MPTCP headers of the second plurality of MPTCP packets to identify an application running on the electronic device associated with each of the second plurality of MPTCP packets; and directing each respective MPTCP packet of the second plurality of MPTCP packets to the application running on the electronic device associated with the respective MPTCP packet based on said parsing the MPTCP headers of the second plurality of MPTCP packets.

9. The method of claim 8,
wherein if an application associated with a respective MPTCP packet of the second plurality of MPTCP packets executes on the electronic device, directing the respective MPTCP packet to the application associated with the respective MPTCP packet comprises providing MPTCP payload data of the respective MPTCP packet to the application executing on the electronic device.

10. The method of claim 8,
wherein directing a respective MPTCP packet of the second plurality of MPTCP packets to the application associated with the respective MPTCP packet comprises providing MPTCP payload data of the respective MPTCP packet to an application service center for the application, wherein the application service center is external to the electronic device.

11. The method of claim 8,
wherein each MPTCP header further comprises a flag for indicating whether or not application specific tags are enabled, wherein application specific tags are not enabled if there is only one application stream actively using the MPTCP connection between the electronic device and the remote endpoint.

12. The method of claim 8,
wherein the MPTCP connection with the remote endpoint comprises a plurality of MPTCP subflows.

13. The method of claim 12,
wherein in response to all but one of the MPTCP subflows being removed from the MPTCP connection, the electronic device is further configured to downgrade the full DSS option to a simplified DSS option that does not provide MPTCP level data sequencing.

14. A non-transitory computer accessible memory medium comprising program instructions which, when executed at a processing element of a device, cause the device to implement a method, comprising:

establishing a multipath transmission control protocol (MPTCP) connection with a remote endpoint;

receiving a plurality of MPTCP packets over the MPTCP connection, wherein the plurality of MPTCP packets comprise first MPTCP packets corresponding to a first application and second MPTCP packets corresponding to a second application, wherein the first and second MPTCP packets are multiplexed over the MPTCP connection;

parsing at least a portion of MPTCP headers of the plurality of MPTCP packets, wherein an MPTCP header of each MPTCP packet comprises information identifying an application to which MPTCP payload data of that MPTCP packet corresponds, wherein each MPTCP header comprises an MPTCP full data sequence signal (DSS) option that enables identification of the application to which MPTCP payload data of that MPTCP packet corresponds, wherein parsing at least a portion of MPTCP headers of the plurality of MPTCP packets identifies the application to which MPTCP payload data of each MPTCP packet corresponds; and directing MPTCP payload data of each MPTCP packet of the plurality of MPTCP packets to a respective corresponding application running on the device based on parsing at least a portion of MPTCP headers of the plurality of MPTCP packets.

15. The memory medium of claim 14, wherein directing the MPTCP payload data is not based on parsing the MPTCP payload data.

16. The memory medium of claim 14,
wherein the first MPTCP packets of the plurality of MPTCP packets received over the MPTCP connection comprise MPTCP payload data corresponding to a first application stream,
wherein the second MPTCP packets of the plurality of MPTCP packets received over the MPTCP connection comprise MPTCP payload data corresponding to a second application stream.

17. The memory medium of claim 14,
wherein the MPTCP header of each MPTCP packet further comprises information indicating that the MPTCP packet comprises information identifying an application to which MPTCP payload data of that MPTCP packet corresponds.

18. The memory medium of claim 14,
wherein the MPTCP connection with the remote endpoint comprises a plurality of MPTCP subflows.

19. The memory medium of claim 18,
wherein in response to all but one of the MPTCP subflows being removed from the MPTCP connection, the electronic device is further configured to downgrade the full DSS option to a simplified DSS option that does not provide MPTCP level data sequencing.

20. The non-transitory computer accessible memory medium of claim 14,
wherein the MPTCP header of each MPTCP packet comprises information identifying an application to which MPTCP payload data of a MPTCP packet corresponds as part of the full data sequence signal (DSS) format.

* * * * *